United States Patent [19]
Roustaei

[11] Patent Number: 5,550,366
[45] Date of Patent: Aug. 27, 1996

[54] OPTICAL SCANNER WITH AUTOMATIC ACTIVATION

[76] Inventor: Alexander Roustaei, 2454 Rue Denise, La Jolla, Calif. 92037

[21] Appl. No.: 262,785

[22] Filed: Jun. 20, 1994

[51] Int. Cl.⁶ ................................................. G06K 7/10
[52] U.S. Cl. ........................................... 235/462; 235/455
[58] Field of Search ................................... 235/462, 472, 235/455, 466

[56] References Cited

U.S. PATENT DOCUMENTS

| | | | |
|---|---|---|---|
| 4,874,933 | 10/1989 | Sanner | 235/470 |
| 4,877,949 | 10/1989 | Danielson | 235/462 |
| 4,933,538 | 6/1990 | Heiman | 235/462 |
| 5,192,856 | 3/1993 | Schaham | 235/462 |
| 5,250,790 | 10/1993 | Metlitsky | 235/462 |
| 5,260,553 | 11/1993 | Rockstein | 235/462 |
| 5,270,525 | 12/1993 | Ukai | 235/472 |
| 5,272,324 | 12/1993 | Blevins | 235/462 |
| 5,329,106 | 7/1994 | Hane | 235/472 |
| 5,340,972 | 8/1994 | Sandor | 235/472 |

*Primary Examiner*—Donald T. Hajec
*Assistant Examiner*—Karl D. Frech
*Attorney, Agent, or Firm*—Brown, Martin, Haller & McClain

[57] ABSTRACT

The optical scanner has an optical scanning head with LED light sources, focusing and receiving optics and a CCD detector array all mounted on a printed circuit board. This assembly, along with a storage buffer and a decoder is contained within a small housing which is attached on its lower side to a semi-glove which the user can wear on the back of his or her hand. The automatic sensing feature of the invention provides hands-free operation by automatically and periodically testing for the presence of a bar code in the scanner's field of view. If the presence of a bar code is detected, the scanner is placed in active mode. When the scanner is not in use, the scanner is powered down to conserve energy.

11 Claims, 2 Drawing Sheets

OPTICAL SCANNER WITH AUTOMATIC ACTIVATION

BACKGROUND OF THE INVENTION

Optical scanners for reading and decoding encoded information have been applied to a wide range of uses including pride and inventory control, file or packaging tracking, identification cards and badges, and others. In many situations, the application of the scanner requires a degree of mobility, i.e., the scanning devices must be moved to the object with the information printed thereon. This mobility may be provided by cords or cables electrically connecting the optical device to the data processing/output device, or the optical device may be combined with the data processor and a battery in a hand-held housing. The latter device, while being conveniently mobile, must be carefully managed in order to avoid rapid depletion of the battery. Most commonly, this power management is achieved by providing on/off switches or triggers which activate the device when scanning is required. In order to manually activate the device the user must have at least one finger free to depress the switch. If an on/off switch is provided, there is a risk that the power could be left on inadvertently, draining the battery. If the housing is designed with a spring-loaded trigger conveniently located in the handle, the user need only hold the handle to activate the scanner. If not, the user must hold the housing in one hand and activate the scanner with the other. In either case, the user is prevented from using both hands to position the encoded information for scanning. When a significant number of items need to be shifted or repositioned during scanning, having limited use of both hands can be inconvenient and inefficient. It would be advantageous to free up both the user's hands for optimal efficiency in handling the items to be scanned.

SUMMARY OF THE INVENTION

It is an advantage of the present invention to provide a portable optical scanner that can be operated without tying up either of the user's hands.

It is a further advantage of the present invention to provide an optical scanner which consumes a minimal amount of power while remaining available at all times for scanning.

Another advantage of the present invention is to provide an automatically activated optical scanner which requires no manual triggering.

In an exemplary embodiment, the optical scanner has an optical scanning head with LED light sources, focusing and receiving optics and a CCD detector array all mounted on a printed circuit board. This assembly, along with a storage buffer and a decoder is contained within a small housing which is attached on its lower side to a semi-glove which the user can wear on his or her hand. The optical scanner is, thus, worn on the back of the user's hand. A cable connects the scanner to the processing system which is contained with a separate housing which can either be carried with the user on a belt or may be placed on a nearby surface. In order to direct the scanner toward the information to be scanned, the user simply points the hand on which the scanner is carried toward the item.

The automatic sensing feature of the invention provides hands-free operation by automatically and periodically testing for the presence of a bar code in the scanner's field of view. If the presence of a bar code is detected, the scanner is placed in active mode. When the scanner is not in use, the scanner is powered down to conserve energy. The automatic scan system includes a clock controller which provides a signal to the optical scanning head to power up the analog section of the CCD detector, which allows the detector to produce discrete pulses of analog voltage samples, one pulse for each pixel. The output of the detector is held at each pixel's voltage for the period that the clock signal is held high. The analog-to-digital converter (ADC) only samples the detector output during the time the detector is stable, so no oversampling is necessary, and no analog-to-digital quantization occurs. The timing generator supports a special mode to rapidly dump and reset the contents of the detector. When this signal ("CCDDUMP") is asserted, the detector clock becomes a divide-by-2 of the input clock. When in the CCDDUMP mode, no analog-to-digital conversions take place, and no data is latched. In that mode, the scanner performs up to five quick scans, during which the signal generated by the detector is tested to determine if an acceptable exposure was achieved. If the exposure was acceptable the signal is stored in the buffer. If more than 20 transitions have been detected, the contents of the buffer are interpreted, looking for a valid quiet zone followed by at least 10 bars and spaces, each less than the width of the quiet zone. If this characteristic is found, the scanner will enter its active acquisition mode and attempt to read and decode the signal. If this characteristic is not found, the analog section will power down within a range of 1 to 5 seconds, which may be programmed, and wait for the set delay time before repeating the test scans. The delay time before retesting is typically on the order of 1 second.

When a "good read" is detected, i.e., the scanner reads a valid quiet zone followed by at least 10 bars and spaces, the scanner will begin a deactivate polling algorithm to determine whether the user has removed the bar code that was just scanned from the scanner's field of view. The scanner will periodically attempt a scan at a configurable interval, adjusting exposure as necessary. The software will scan the contents of the buffer which would fail the test for a "good read". Upon detection of the first failure, the software will rapidly scan 3 more times. If the test for a "good read" fails on three consecutive tries, the scanner will deactivate and begin searching for a new start condition as described above. Otherwise, the scanner will continue to periodically scan, waiting for the user to remove the bar code from the field of view.

The optical scanning head which is improved by the automatic activation feature of the present invention is disclosed in U.S. Pat. Nos. 5,349,172, and 5,354,977, 5,291,009, co-pending applications Ser. Nos. 08/059,322, 08/058,951 and 08/137,426, of the present inventor.

BRIEF DESCRIPTION OF THE DRAWINGS

Understanding of the present invention will be facilitated by consideration of the following detailed description of a preferred embodiment of the present invention, taken in conjunction with the accompanying drawings, in which like reference numerals refer to like parts and in which.

DETAILED DESCRIPTION OF A PREFERRED EMBODIMENT

Figure 1:
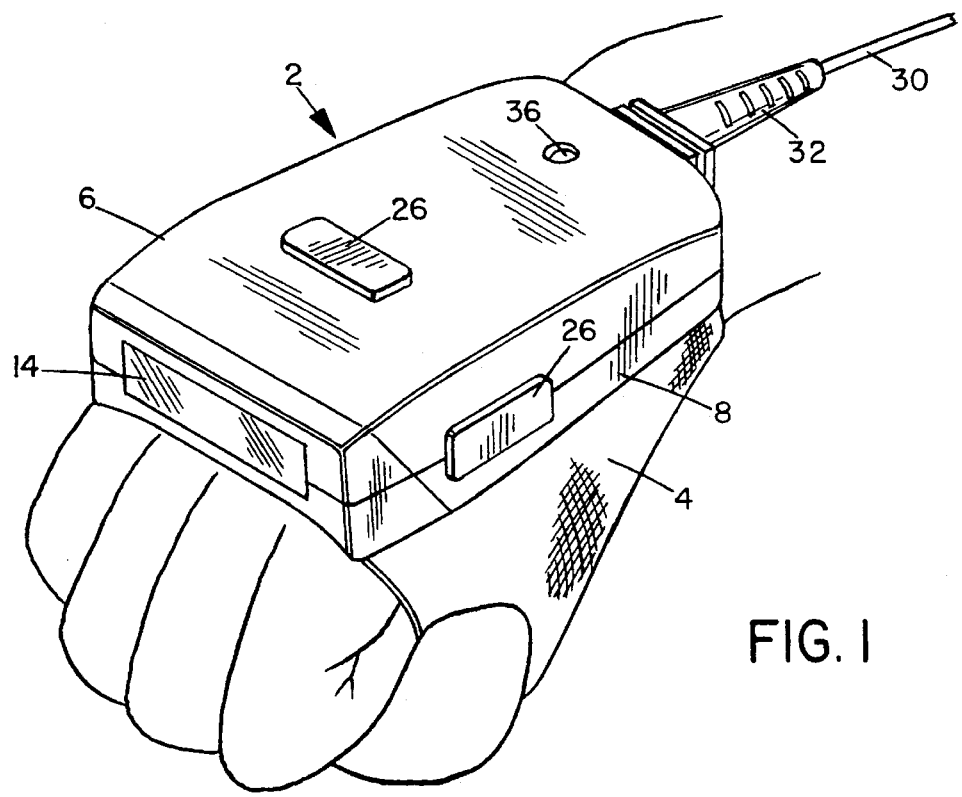
FIG. 1 is a perspective view of the optical scanner worn on a user's hand for hands-free operation.

As illustrated in FIG. 1, the optical scanner 2 is attached to a semi-glove 4 which allows the scanner 2 to be worn by the user, leaving his or her hands free to grasp or move items bearing the bar codes to be scanned. For operation, the user needs only to point his or her hand toward the target.

Figure 2:
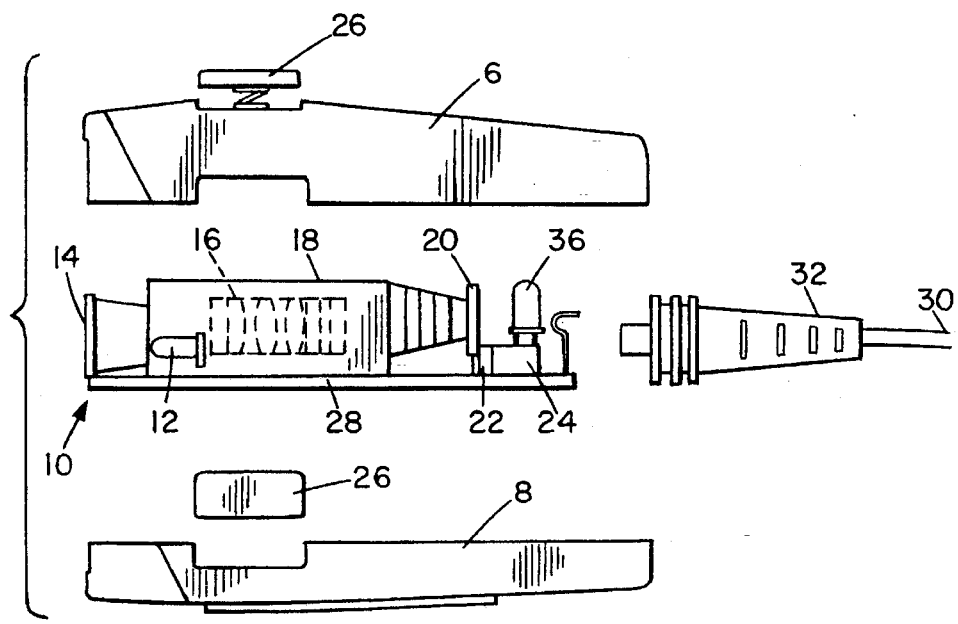
FIG. 2 is an exploded side view of the optical scanner.

The details of the structure of scanner 2 are illustrated in FIG. 2. The scanner has a housing comprising a top shell 6 and a bottom shell 8 made of a molded plastic or light weight metal within which is contained the optical scanning head 10. The dimensions of the housing are small enough to fit comfortably on the back of the user's hand without extending a significant distance beyond the hand, i.e., the size of the user's fist. This depends, of course, on the size of the user's hand. Typically, the housing dimensions will be on the order of 1.4 inches (35.6 mm) in height, 2.0 inches (50.8 mm) wide, and 3.4 inches (86.34 mm) long. The weight is approximately 1.7 oz (48.2 gm). Alternatively, this scanner can also be used in fixed mount scanning applications.

Figure 3:
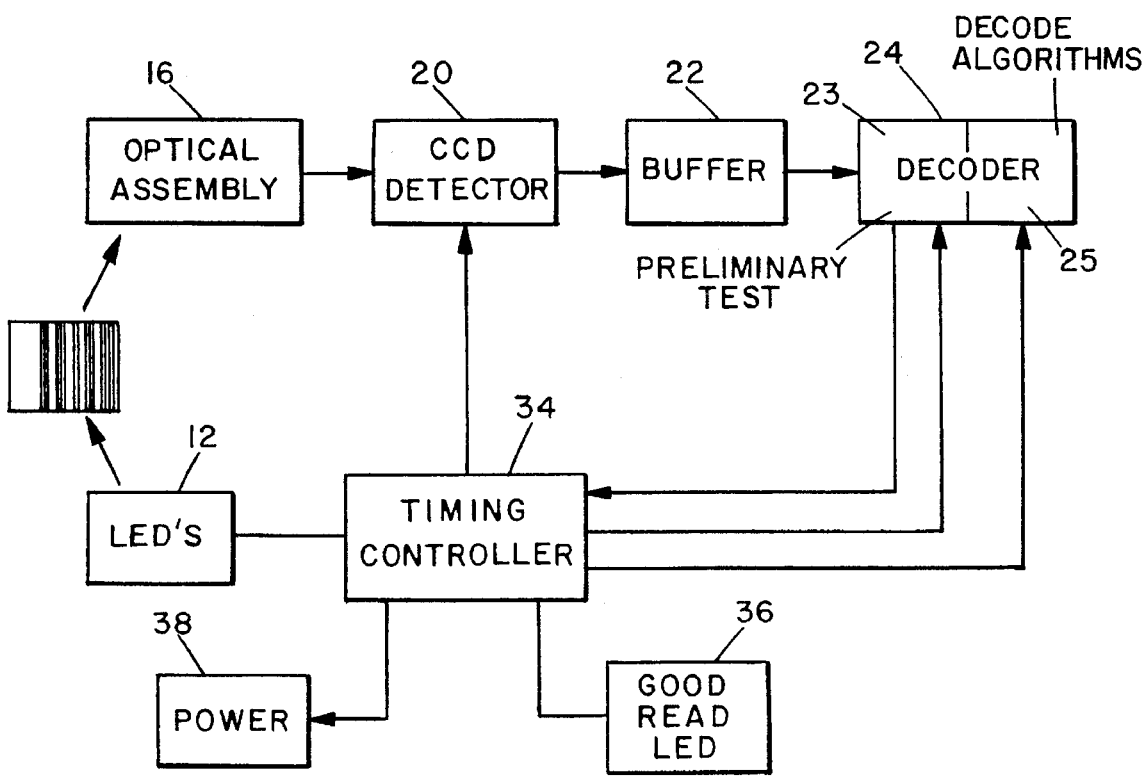
FIG. 3 is a block diagram of the sequence of operation of the optical scanner.

Optical scanning head 10 which is disclosed in U.S. Pat. Nos. 5,291,009, 5,349,112, and 5,354,971, and co-pending applications Ser. Nos. 07/965,991, 08/059,322, 08/058,951 and 08/137,426, has a plurality of LED light sources 12, a window 14, an optical assembly 16 comprising a number of lenses and filters contained within a dark room 18, and a detector 20, all mounted on a printed circuit board (PCB) 28. Detector 20, a CCD array, provides an output signal representative of the incoming modulated light it detects which is stored in a memory buffer 22 connected to decoder 24. This process flow is shown in FIG. 3. Timing and power controller 34 within optical scanning head 10 provides clock functions for the scan sequences including gating the application of power from power supply 38 to components of the scanner for purposes of power conservation.

The decoder 24 comprises a microprocessor which includes software for power management, LED control, CCD control, signal processing, laser emulation, wand emulation, keyboard emulation and auto-sense active /inactive.

In the prototype of the invention, the detector array 20 is a CCD linear sensor which requires a single +5 V power supply (38) to operate. Since a single power supply is used for both the analog and digital sections of the scanner, some signal degradation may occur. High frequency digital noise injected into the power and ground planes may exceed the analog signal level, thus impacting the maximum resolution of the scanner. A number of techniques have been used to limit the digital noise that may be coupled into the analog power supply. First, the analog power and ground nets were isolated and routed separately from other power supply and ground nets. Single-point power and ground distribution nodes route the noise in the digital power and ground nets back to the point where the power enters the PCB 28 on which the scanning head components are mounted. The analog power and ground nets use TDK®Ferrite Chip Wideband EMI Suppressors to attenuate high-frequency noise. The EMI suppressors have high impedance and substantial EMI suppression over a wide frequency range. A passive LC filter was also employed to reduce low frequency noise generated by the digital section. The values and calculation for the LC filter are as follows:

frequency $f$ = 55 Khz
capacitance $C$ = 22 μF
inductance $L$ = 22 μH
resistance $R$ = .125 ohm $$\frac{\frac{1}{2\pi fC} + R}{2\pi fL + ((2\pi fC)^{-1} + R)} = 0.033 \tag{1}$$

External triggers 26 may be included if manual activation is desired. For convenience, multiple triggers 26 are provided to allow activation from different sides of the scanner housing. If the automatic activation feature is to be used, a switch may be provided to select manual or automatic activation, or selection of automatic or manual operation can be software controlled. An indicator 36 comprising an LED or LCD display is disposed within the top shell 6 to provide visible confirmation of a good read.

The scanner 2 may be attached to the semi-glove 4 by hook-and-pile fasteners 7, snaps, straps, or any other means by which the scanner can be kept in place on the semi-glove 4 with sufficient stability that the user can move his or her hand freely, yet allow the scanner 2 to be separated from the semi-glove. The material of which the semi-glove 4 is made can be leather, fabric, Neoprene®, or any other comfortable material which is soft and flexible.

Alternatively, the scanner housing can be held in the user's hand. Further, the scanner may be either permanently or temporarily mounted in a stand such that items to be scanned will be passed by the fixed scanner.

The cable 30 which connects the scanner 2 to the decoder 24 should be sufficiently flexible that the user's movement is not unnecessarily restricted yet strong enough to withstand the stresses and strains that may be encountered during use. To provide reinforcement at the point at which the cable will likely experience a substantial amount of strain, a flexible rubber or rubber-like boot 32, as is known in the art, surrounds the cable 30 where it exits the scanner 2.

Figure 4:
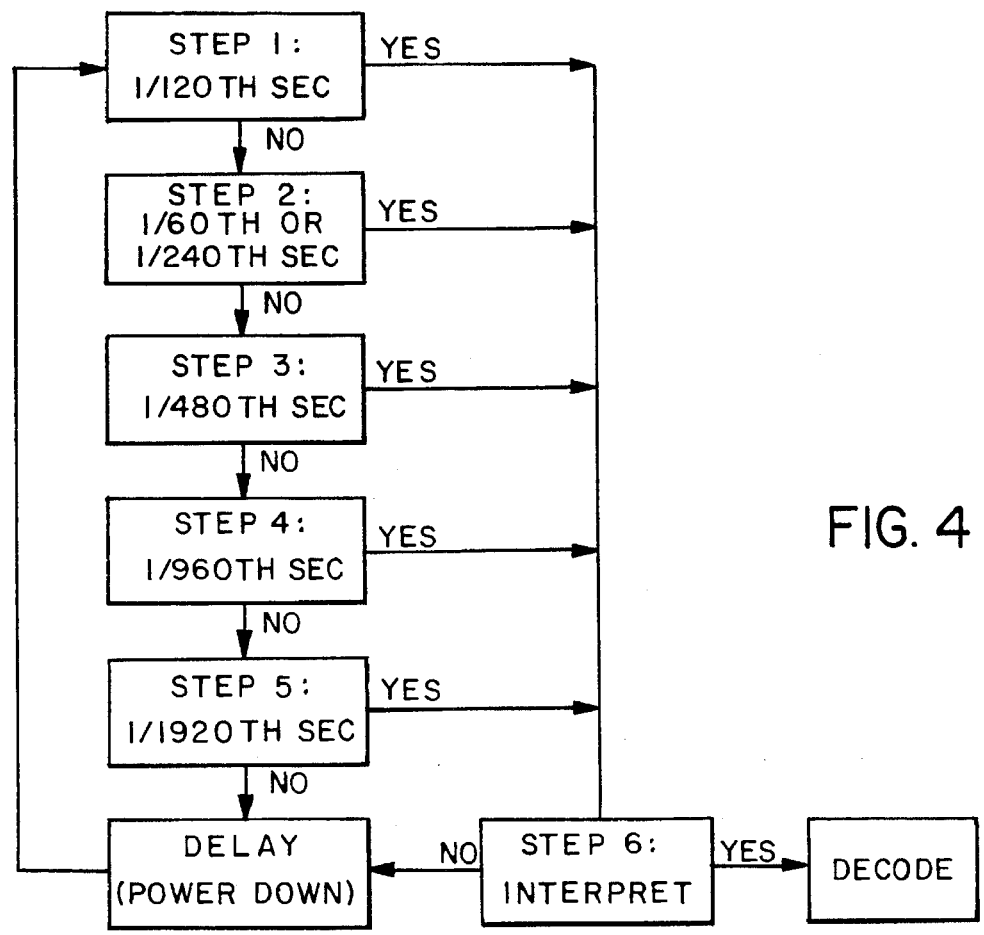
FIG. 4 is a block diagram of the sequence of the automatic activation feature.

The automatic activation feature provides power efficient hands-free operation by periodically testing for the presence of a bar code within its field of view. The sequence of the auto activation feature is illustrated in FIG. 4.

While in an inactive mode, the optical scanning head 10 periodically powers up the analog section of the CCD detector 20, which allows the detector to produce discrete pulses of analog voltage samples, one pulse for each pixel. The output of the detector is held at each pixel's voltage for the duration of the "high" clock signal. The analog-to-digital converter (ADC) only samples the detector output during the time the detector output is stable, so no oversampling is necessary, and no ADC quantization occurs. The timing generator supports a special mode, i.e., a signal is produced, to rapidly dump and reset the contents of the detector. When this CCDDUMP signal is asserted, the detector clock becomes a divide-by-2 of the input clock. When in the CCDDUMP mode, no analog-to-digital conversions take place, and no data is latched. In that mode, the scanner activates LED light source 12 to perform up to five quick scans with little or no delay between the scans. The signal generated by the decoder 20 is temporarily stored in buffer 22. During the inactive scan sequences only preliminary functions are performed by the decoder 24, testing the contents of the buffer 22 for sufficient exposure and counting how many transitions are present in a scan, then comparing the number of transitions to a threshold. To conserve energy, the more complex decoding algorithms are not performed during this sequence. In this manner, the decoder is divided into two portions, i.e., a first portion 23 which conducts the preliminary testing and a second portion 25 that performs the decoding algorithms. The period of this test is on the order of 1 second, but may be adjusted as desired to either increase the frequency for faster response or to decrease the frequency to conserve even more energy.

The first step of the test sequence is a 1/120th of a second scan. If this exposure is good, the scanner will skip to step six which is described below. The test for a good exposure is to look for a fixed number of transitions, in this case 20, which represents the presence of a bar code in the field of view, i.e., 10 bars and 10 spaces. No decoding is done at this point.

If the exposure in the first step does not indicate the appropriate number of transitions, the scanner proceeds to the second step which is a scan at either 1/60th or 1/240th of a second, based upon the previous scan. (The scanner will have in memory the scan time for the most recent successful scan which is then used for the next scan.) If the exposure is good, the scanner will skip to step six. If not, step three is performed.

Step three is a scan of 1/480th of a second. The step four scan is for 1/960th of a second, and the fifth step is a scan for 1/1920th of a second. Thus, each scan step is one-half the duration of the previous scan. If a good exposure is obtained after any of these individual steps, the scan jumps to step six. If the exposure is not good, the subsequent step is performed. If no good exposures occur during steps one through five, the scanner will repeat the testing sequence at the predetermined interval (1 second).

Step six takes the signal generated during a good exposure and interprets the contents of buffer 22 in which the scan signal is stored to look for a valid quite zone, which is eight times the first bar width, followed by at least 10 bars and spaces, each having widths less than the width of the quiet zone. If this characteristic is found, the scanner will enter the active acquisition mode and attempt to decode the scanned bar code to generate a decoded output. If not, the scanner will power down its analog section and wait for the delay period before beginning over at step one.

A non-productive timeout is established so that the scanner powers down quickly after failure to detect the conditions for activation according to step six. This decreases power consumption in the event the scanner is accidentally triggered.

Upon the detection of a "good read", i.e., one which passed the criteria of step six and was successfully decoded, the scanner initiates a deactivate polling algorithm to determine whether the user has removed the just-scanned bar code from the scanner's field of view. The scanner periodically attempts a scan at a configurable interval, adjusting the exposure as necessary. The interval is programmable from one-half second up to five seconds by one-half second increments. The decoder has the ability to decode all common bar code symbologies. The decode choices will be selected by reading a bar code and will include the ability to automatically discriminate among the different symbologies. The selection of the bar code decoding parameters will be via bar code programming stored in nonvolatile memory. The symbologies available in the decoder include: UPC-A, UPC-E0, UPC-E1, EAN/JAN-8, EAN/JAN-13, Code 3 of 9, Interleaved 2 of 5, and Codabar Code 128.

The decoder will scan the contents of the transition buffer 22 looking for a pattern which would fail the test in step six, meaning that a match could not be found for any of the symbologies which the decoder has stored in memory. Upon detection of the first failure the software within the decoder will rapidly scan three more times. If the test in step six above fails on three consecutive tries, the scanner will deactivate and begin searching for a new start condition according to the six step sequence. Otherwise, the scanner will continue to periodically scan waiting for the user to remove the bar code from the field of view.

The above sequence for automatically activating and deactivating the data acquisition made of the optical scanner provides substantial power conservation. Every second of the inactive scan uses only 3% of the power utilized during an active mode scan. In combination with the glove-mounted housing, the automatic activation sensing provides hands-free scanning, giving the user virtually unrestricted movement and use of both hands for handling of the items to be scanned. The ability to activate the data acquisition function by simply placing the bar code to be scanned within the field of view of the scanner further enhances the hands-free operation as well as significantly reducing power consumption.

It will be evident that there are additional embodiments and applications which are not disclosed in the detailed description but which clearly fall within the scope and spirit of the present invention. The specification is, therefore, not intended to be limiting, and the scope of the invention is to be limited only by the following claims.

I claim:

1. An optical scanner for scanning a bar code, the scanner comprising:

an optical scanning head having an LED light source, an optical assembly, and a detector, said detector generating a signal representative of modulated light reflected from a surface within a field of view of the scanner;

a power supply;

a decoder having a preliminary testing portion and a decoding algorithm portion for receiving and processing said signal;

a timing controller for controlling application of power from said power supply to said optical scanning head and said decoder, said timing controller providing a scan command during an inactive mode of the scanner so that power is periodically provided to said optical scanning head to scan said surface within the field of view and to said preliminary testing portion of said decoder to conduct comparisons of said signal to a threshold, the threshold being a minimum number of transitions indicative of said bar code, so that when said minimum number of transitions is found, said scanner enters an active mode for processing said signal within said decoding algorithm portion of said decoder to generate a decoded output, and so that when said minimum number of transitions is not found, said scanner remains in said active mode;

wherein said scan command comprises a test sequence of distinct scan periods, each scan period having a different scan duration from other scan periods of said test sequence, said test sequence terminating when a good exposure is achieved.

2. An optical scanner as in claim 1 wherein at least one said scan period of said test sequence has a duration longer than the duration of the previous scan period of said test sequence.

3. An optical scanner as in claim 1 wherein each said scan period of said test sequence of scan periods has a duration of one-half the duration of the previous scan period of said test sequence.

4. An optical scanner as in claim 1 wherein said preliminary testing portion of said detector further looks for a quiet zone having a zone width substantially greater than a transition width prior to entering said active mode.

5. An optical scanner as in claim 1 wherein said minimum number of transitions is 20.

6. An optical scanner as in claim 1 wherein a frequency at which said power is periodically provided is one per second.

7. An optical scanner as in claim 1 wherein said timing controller further provides a periodic deactivate signal during said active mode to place said scanner in said inactive mode when said minimum number of transitions is not found in three consecutive scans.

8. An optical scanner as in claim 1 further comprising:

a housing for containing said optical scanning head and said decoder; and a semi-glove for wearing on a user's hand, and a releasable fastener for attaching said housing to a back of said semi-glove.

9. An optical scanner as in claim 8 wherein said housing has dimensions which are generally fist size.

10. An optical scanner as in claim 1 further comprising a buffer wherein said signal generated by said optical scanning head is stored for processing by said decoder.

11. An optical scanner as in claim 1 further comprising:

a housing for containing said optical scanning head and said decoder, said housing having dimensions for holding in a user's hand.

* * * * *